March 26, 1957 — W. H. SHAPERO — 2,786,238
DIP METHOD OF FABRICATING FLEXIBLE CONTAINERS OF SYNTHETIC RESIN PLASTIC MATERIAL
Filed Oct. 2, 1951

WALLACE H. SHAPERO
INVENTOR.

BY Lynn H Latta
ATTORNEY.

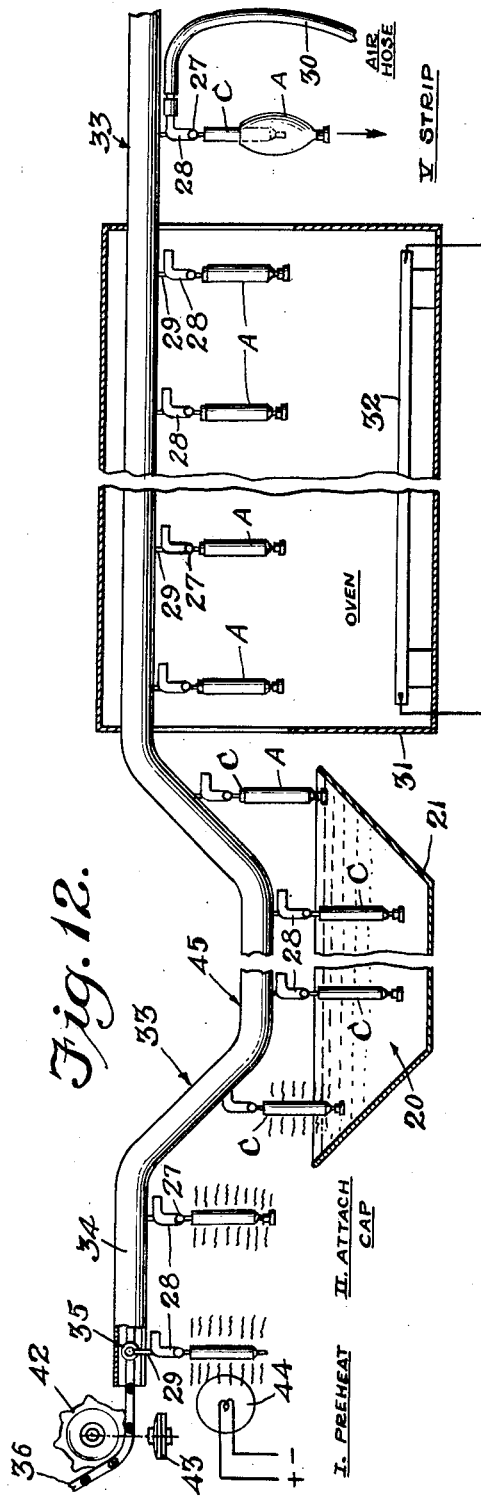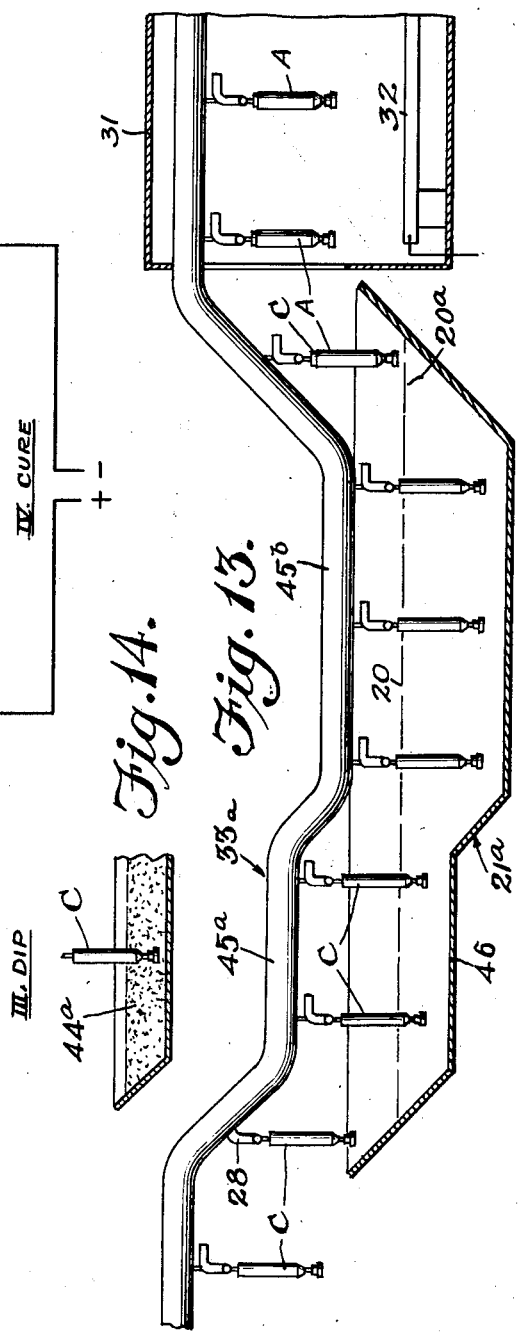

2,786,238

DIP METHOD OF FABRICATING FLEXIBLE CONTAINERS OF SYNTHETIC RESIN PLASTIC MATERIAL

Wallace H. Shapero, Los Angeles, Calif., assignor to Wallace Containers Company, Los Angeles, Calif.

Application October 2, 1951, Serial No. 249,269

3 Claims. (Cl. 18—59)

This invention relates to the making of containers from plastic materials such as synthetic thermoplastic resins, latex, synthetic rubber, etc. The invention is particularly useful in the manufacture of flexible tube type containers (now commonly extruded from lead or other soft metals).

An object of the invention is to provide an improved method of fabricating a container from a plastic material originally in liquid form, by a dipping process. Another object is to provide an improved dipping process for the production of such articles as flexible tube containers. A further object is to provide an improved process whereby a container having a reduced threaded neck, of relatively thick walled structure and an enlarged body portion of relatively thin wall "skin" structure, integral with such neck, may be initially formed by a single dip operation. A further object is to provide an improved process whereby a container having a reduced threaded neck and a cap threaded thereon may be fabricated in a series of steps including a dipping step in which the body or skin of the container, plus the threaded neck, plus a thin film covering the cap, are initially formed in one integral, continuous coating on a mandrel, which coating, upon being cured, becomes a finished container with a cap sealed to the neck by a covering film which is integral with the body of the container.

Another object is to provide an improved method of fabricating such a container, in which the film covering the cap is joined to the neck by a thinned annular web functioning as a readily frangible connection along a parting line disposed at the edge of the cap, whereby to facilitate separation of the cap from the container.

Another object is to provide an improved process for rapidly fabricating large numbers of containers by a series of steps in which mandrels are dipped into a body of liquid plastic in a single dipping operation, are then removed, each having a coating of the liquid plastic material adhering thereto in regulated thickness with a relatively thin walled portion constituting the neck of the container; in which the coated mandrels are then subjected to a curing operation of relatively short duration, to cure the coating into a form retaining container, with threaded cap attached and with the threads of the container neck formed by the threads of the cap functioning as a mold; and in which, subsequently, the containers, in completed form ready for filling, are stripped from the mandrels, each with its cap still attached thereto and sealed thereto by a thin film integral with the container body.

A further object is to provide an improved method for controlling varying thicknesses of plastic material adhering to a mandrel after the same has been dipped in a body of liquid plastic, thereby making it possible to fashion a container having a relatively thick walled neck portion and a relatively thin walled body portion.

A further object is to provide an improved method of rapidly curing a plastic coating adhering to a dipping mandrel.

A further object is to provide an improved method of fabricating a container of flexible plastic material having an integral neck and a cap of harder material threaded thereon and sealed to the container by a covering film of plastic material integral with the container body.

Other objects will become apparent in the ensuing specifications and appended drawings in which:

Fig. 12 is a schematic illustration of the major steps in the entire process of fabricating the flexible tube.

Fig. 13 is a schematic illustration of a modified form of the method; and

Fig. 14 is a schematic illustration of a modified form of the preheating step.

THE CONTAINER ARTICLE

Figure 1:
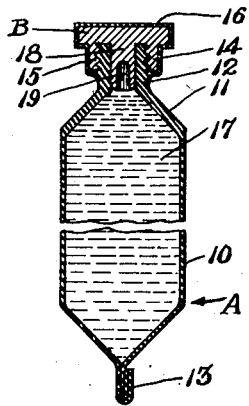
Fig. 1 is a sectional view of a flexible tube container made by the process of my invention.

Referring now to the drawings in detail, I have shown in Fig. 1, as an illustrative embodiment of a container made by the process of my invention, a flexible tube A completely fabricated, filled, and sealed. The container A has a body portion defined by a relatively thin lateral wall or skin 10, a conical shoulder portion 11 of somewhat greater thickness than the skin 10, and an externally threaded, reduced neck 12 of even greater thickness. The opposite end of the container is sealed in a conventional manner by a fold 13 extending the full width of the tube and welded in any suitable manner, to effect a seal. The welding may be accomplished by pressing the fold 13 between heating means (diathermic or induction or other) at a temperature sufficient to soften the material and cause it to adhere, or may be effected by softening the surfaces of the folds by the use of a solvent for the material and then suitably pressing them together.

Threaded upon the neck 12 is a cap B which is preferably of a harder material than the tube itself, so as to have a rigid, non-yielding form. Cap B has a skirt portion 14 provided with an internal thread 15 which matches an external thread on neck 12 to provide the threaded connection between the two. The neck 12 is received in an annular space 39 defined between skirt portion 14 and a stem member 18 on cap B. Cap B is covered and sealed to the container by a relatively thin skin or coating 16 of the same plastic material which constitutes the body of the tube, the skin 16 being integral with the neck 12 as indicated. The skin 16 provides a complete hermetic seal for the container and cap, protecting and preserving the contents against any possible infiltration of air and the deterioration which might result therefrom. Where the tube is used to contain a medicant, this hermetic seal assures against any possibility of contamination of the contents 17 of the tube by bacteria or dirt.

The entire body of the container, the neck 12, and the sealing covering 16 are integrally formed from a plastic material which may originally exist in liquid form so that these parts may be fabricated in a dipping operation. A suitable material is a vinyl plastisol which, in a liquid body 20 (Fig. 12), may be maintained in a dipping tank 21. It is also possible to utilize liquid latex and other plastic materials capable of use in dipping operations. The cap B has the centrally disposed stem 18 which, when the cap is attached to the neck 12, fills the throat passage of the neck so as to prevent the neck from collapsing. Stem 18 may have an axial, end opening cavity 19 to provide for attaching the cap to the mandrel as will hereinafter be more specifically described. The annular space 39, corresponding exactly to the shape of neck 12, is defined between stem 18 and skirt 14, and is filled by neck 12 when the cap is attached.

Figure 5:
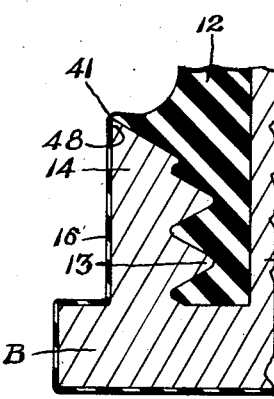
Fig. 5 is an enlarged sectional view of adjoining fragments of the cap and tube neck, showing the thinned frangible connecting web.

The cap coating 16 is joined to neck 12 at the edge of the cap, by a thinned web 41 (Fig. 5) which is thinner than coating 16 so as to provide a weakened, readily frangible connection between coating 16 and neck 12, along a circular parting line at the edge of the cap. Thus in the initial removal of the cap, the user may readily separate it from the neck simply by applying unscrewing torque to the cap.

THE APPARATUS

Figure 2:
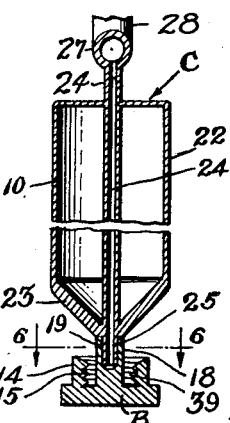
Fig. 2 is an axial sectional view through the mandrel used in the process of my invention with tube, container cap attached thereto.
Figures 6, 9:
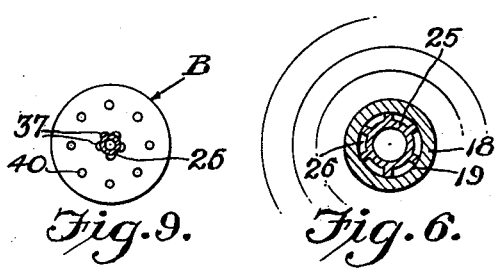
Fig. 6 is a transverse sectional view through the neck portion of the mandrel taken on the line 6—6 of Fig. 2.
Fig. 9 is a transverse sectional view taken on line 9—9 of Fig. 8.

Fig. 2 illustrates my improved mandrel indicated generally at C, in the form of a hollow, elongated shell having a lateral wall 22 which ordinarily will be of cylindrical form to shape the thin lateral wall 10 of the container body, having a conical nose portion 23 to shape the conical shoulder 11 of the tube, and having a tubular stem 24 extending therethrough from end to end. Stem 24 has an end member 25 projecting from nose portion 23 of the mandrel and receivable in cavity 19 of cap core 18 with a friction fit sufficient to support the cap thereon as shown in Fig. 2. Stem member 25 may have a fluted external surface (Fig. 6) which provides a plurality of air passages 26 between the stem member and the lateral wall of cavity 19. Thus air may be forced through stem 24 and allowed to escape between the end of core 18 and the end of mandrel nose 23.

Figure 11:
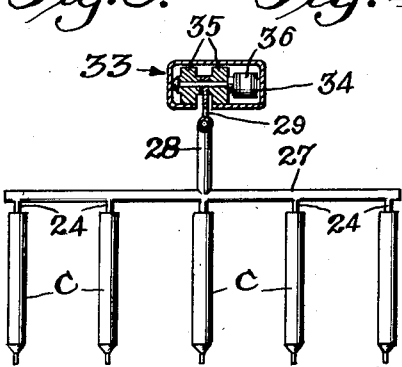
Fig. 11 is a side view of a gang of mandrels.

The opposite end of stem 24 provides a support from which the mandrel may be hung. As shown in Fig. 11, I prefer to employ a gang of mandrels depending from a transverse bar 27. Bar 27 may also function as a manifold to distribute air under pressure to the several stems 24, and consequently, may be in the form of a tube with its ends closed and with a series of apertures into which the ends of respective stems 24 are secured. An L-shaped fitting 28, secured to a conveyor hanger 29, may serve as a support for bar 27, being attached to and pneumatically communicating with the center thereof. Hanger 29 (Fig. 12) forms part of a conveyor 33. Fitting 28 has an open end which may be attached to an air hose 30 whereby air under pressure may be simultaneously injected into the entire gang of mandrels, to eject the completed containers therefrom.

The apparatus includes, in addition to the gang of mandrels and the dipping tank 21 (which is of sufficient width to receive the entire gang of mandrels simultaneously), an oven 31 having a suitable element 32 therein, together with the conveyor 33, for conveying the mandrels through the oven from one end to the other.

Conveyor 33 may be of any conventional form, such as for example, a track 34 of C-section, a series of the hangers 29 having rollers 35 to travel in track 34, and a suitable cable or chain 36, to which the hangers 29 are attached. Any conventional driving means for driving the conveyor chain 36, may be employed, and may include a sprocket 42 driven through a slipping drive element 43 adapted to allow an operator to manually arrest the conveyor while attaching a mandrel gang thereto or removing the gang therefrom.

The heating means (for curing) may consist in the electrical heating element 32 shown in Fig. 12, or may comprise a gas burner, or infra-red heating lamps, or high frequency induction heating means. Since each of these types of heating means are well known no attempt will be made to further particularize thereon.

Means is employed for preheating the mandrels C for controlling the amount of plastic which they pick up from bath 20. Such means may be of any of the above mentioned types, although a heated bath is preferred. Purely by way of example, I have shown a preheater in the form of an infrared lamp 44, of which there may be several, arranged in a pair or pairs flanking the path of movement of mandrels C just before entering the dipping bath.

THE PROCESS

Figure 3:
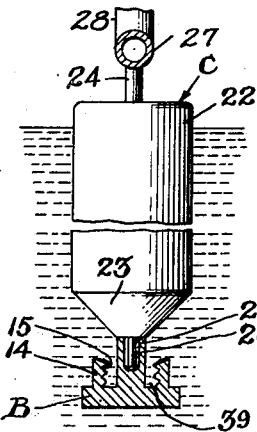
Fig. 3 illustrates the dipping step of my improved process.

The central characteristic of my improved method is the utilization of the container cap 15, attached to the lower end of the depending mandrel 9, as a mold to receive and retain an annular body of the liquid plastic material 20, which annular body becomes the neck 12 of the container. An important characteristic of the invention in this respect is the suspension of the mandrel with the cap 15 at the lower end thereof and inverted, so that the liquid plastic material will fill the same when the mandrel is dipped as indicated in Fig. 3.

Another characteristic of the invention is the preheating of the mandrel in a manner to cause the liquid material to adhere thereto in varying thickness, so as to produce the thicker shoulder portion 11 and neck portion 12 of the container. The preheating of the mandrel conditions it for reaction against the body of liquid plastic in tank 21, to cause a film of the plastic material to thicken sufficiently to adhere to the mandrel.

Fig. 12 illustrates the main steps in the process, including: I. Establishing a preheated condition of the mandrels in which the nose portions 23 thereof are at a higher temperature than the body portion 10, immediately preceding the dipping operation; II. Attaching the cap 15, in an unheated condition, so that it will acquire only a relatively thin film of the liquid plastic material; III. Dipping the attached mandrels and caps into the bath 20 and removing them with coatings of the liquid plastic adhering thereto; IV. Passing the mandrels through the oven 31 while suspended upon conveyor 33, to cure the coatings of liquid material, thereby forming the flexible container tubes; and, after removing the mandrels from the oven; V. Stripping the completed containers from the mandrels.

In detail, the above outlined steps are as follows:

I. *Preheating.*—The preferred method of obtaining a preheated condition in which the nose portion 23 has a higher temperature than the body portion 22 of the mandrel, is to utilize a mandrel in which the nose portion 23 is of greater thickness than the body portion 22; to subject the entire mandrel to a heating operation until all portions thereof are substantially of the same elevated temperature, somewhat above the temperature desired in the shoulder portion 23 at the moment of dipping, and even more above the temperature desired in the body portion 22 at the moment of dipping. The time interval consumed in transferring the mandrels from the preheating oven or other heater, to the dipping tank, and in going through the intermediate step of attaching caps 15, will be such that considerable heat will be lost by radiation. Because of the greater thickness of nose portion 23, it will lose its heat more slowly than the thinner walled portion 22 of the mandrel, and consequently at the moment of dipping, the mandrels will be unevenly heated, with the nose portion 23 at a higher temperature than the body portion 22.

An alternate method of obtaining an unevenly preheated condition in the mandrels is to preheat unevenly, i. e. by concentrating the heating at the lower end of the mandrel. This can be accomplished in the manner indicated in Fig. 14. The lower end portion only of the mandrels are subjected to preheating means 44a which, in this case, is disclosed as being the form of a bath of heated material. Any known liquid or powdered material used in the heat-treating of metals (as in an annealing operation) may be employed. When removed from the preheating means, the mandrel will have the lower portion thereof heated to a temperature considerably higher than the required temperature thereof at the moment of dipping. During the transfer of the mandrel from the preheat means to the dipping bath, the heat will be conducted upwardly through the metal wall of the mandrel, so as to heat the upper portion of the mandrel to a temperature sufficiently high to meet the requirement for preheating of that portion of the mandrel. Thus as the mandrel enters the preheat bath, the heat will be unevenly distributed through the mandrel, with maximum temperature in the lower end and minimum temperature at the upper end.

The preheating step may be one in which the mandrel is heated uniformly and maintains a uniform temperature from end to end thereof at the moment of dipping. The method of obtaining a thickened neck coating under these conditions is described under the subtitle "III. Dipping" hereinafter.

II. *Attaching caps.*—After the mandrels have been preheated, the caps 15 are attached to the stem members 25. The caps 15 are not preheated. Being of a plastic material which is a relatively poorer heat conductor than the metal of which the mandrel is constructed, the caps 15 will remain relatively unheated up to the moment of dipping.

III. *Dipping.*—After the caps 15 have been attached, the mandrels are dipped into the liquid plastic bath 20 as indicated in Fig. 12, held in the bath a short period of time to allow the residual heat of the mandrels to act upon the surrounding liquid to cause it to partially gel against mandrels, and are then removed and attached to the conveyor 33. Because of the higher temperature of nose portion 23, a thicker coating of the liquid plastic will adhere to that portion of the mandrel, thus producing the thickened shoulder portion 11 of the container.

The neck portion 12 of each container is formed by (a) the filling of the cavity 39 (Fig. 2) within the inverted cap 15, with the liquid plastic material, and (b) the retention of an annular body of the liquid plastic material bridging between the upper extremity of cap 15 and the lower end of nose portion 23 to form the unthreaded portion of neck 12. These annular bodies of liquid plastic will remain after the mandrels are lifted out of the bath, owing to the cohesive force developed therein by inherent liquid surface tension, together with the adhesion of their respective axial extremities to the gelled shoulder portions 11 and to the upper extremities of caps 15. Accordingly, the container bodies at this stage of the process will have their final shape, as indicated in Fig. 4, although the various portions 10, 11, 12, thereof will be in varying stages of solidification, with the neck portions 12 remaining in substantially liquid condition, while the wall portions 10, 11 are sufficiently gelled to be form retaining by virtue of their adhesion to the mandrel.

The invention provides for automatic dipping of the mandrels through the operation of conveyor 33. To this end, conveyor 33 has a dip 45 therein, of such contour as to define a path of mandrel movement in which the mandrels are carried downwardly into the bath, are then moved horizontally in the bath a sufficient distance to acquire a coating of the desired thickness, and are then lifted out of the bath preparatory to entering curing over 31.

It will be understood that the mandrel gangs are disposed transversely of the path of conveyor movement, as indicated.

Figure 4:
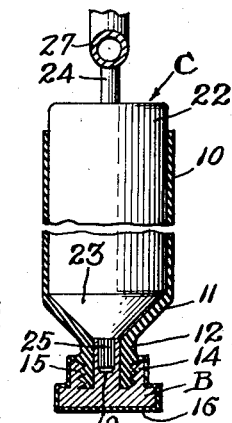
Fig. 4 illustrates the mandrel with cap and plastic coating adhering thereto, immediately after the dipping step.

*Modified dipping method.*—Fig. 13 illustrates how uniformly heated mandrels may be utilized to pick up a coating which has the same general distribution of uneven wall thicknesses illustrated in Fig. 4. In this variant of the method, the uniformly heated mandrels are first dipped to a depth just sufficient to immerse their lower end portions only, are then translated horizontally at this depth, and are subsequently dipped to their full depth and allowed to remain in the bath at that depth until the desired coating thickness is obtained. In the partial dipping in the initial stage of the dipping step, an initial coating is adhered to the immersed lower end of each mandrel, and a substantial portion of the heat stored in the mandrel is dissipated into the bath through such lower end. As the lower ends are cooled, heat will be conducted downwardly from the upper end portions of the mandrels, reducing the temperature thereof, so that as the mandrels are dipped to their full depth, the mandrel temperature will be sufficiently low to pick up the relatively thin coating which is to form the lateral wall 10 of the container. The initial coatings picked up by the lower ends of the mandrels in the initial stage of the dipping step, will be augmented by additional coating of such lower ends in the remainder of the dipping operation, so that the lower end portions of the containers will have the shoulder walls 11 of relatively greater thickness than the wall members 10. Also, the higher mandrel temperature in the initial, shallow dipping stage of the dipping step, will cause a thicker coating to adhere to the lower ends of the mandrel, than is picked up by the remainder of the mandrel in the final stage of the dipping step.

The apparatus for this modified dipping operation is correspondingly changed as shown in Fig. 13. The conveyor 33, instead of having the single dip 45 therein, has a step portion 45a, which provides for the lowering of the mandrels to an intermediate level in which the initial stage of the dipping operation is effected, and a second dip 45b therein which provides for the lowermost level of the mandrels in which they are dipped to full depth in the bath 20a. If desired, in order to avoid unduly increasing the volume of the bath, the tank 21a may have a step 46 therein, disposed below the conveyor step 45a, so that the bottom of the tank is spaced substantially uniformly from the lower ends of the mandrels as they progress through the tank.

*Forming weakened separation line.*—The weakened connecting web is formed as the result of utilizing a sharp edge 48 at the end of cap skirt 14. Edge 48 may be obtained by bevelling the end of the skirt 14 as shown. The film of liquid plastic adhering to the cap will be thinned where it crosses this sharp edge, it will be thinned, due to the combined effect of gravity (the liquid tending to flow downwardly away from the edge) the lack of support provided by the sharp edge, and surface tension which tends to stretch film around the sharp edge.

IV. *Curing.*—After removal from bath 20, the gang of coated mandrels is carried into the oven 31 by the conveyor. In the oven, it is subjected to the action of heated air, heated to a predetermined temperature by the heater 32, and is maintained in the oven for a sufficient period of time to effect a complete cure of the plastic coatings on the mandrels.

An important characteristic of the invention is the employment of mandrels in the form of the thin walled hollow shells. Because of the thinness of the walls of the mandrels, the heat within oven 31 will quickly penetrate them so as to raise them quickly to the curing temperature. I find that by utilizing such thin walled hollow mandrels, it is possible to reduce the curing time below that required for a solid mandrel, by as much as 95%. Thus, instead of requiring a half hour or longer for cure, the process of my invention effects a cure within one or two minutes time, and it is therefore possible to operate the conveyor 33 at a speed which will carry a given gang of mandrels entirely through the oven from end to end thereof, in a matter of a few minutes. This provides for high quantity production in an apparatus of relatively small dimensions.

The results noted above have been secured where the wall thickness of the mandrel is in the neighborhood of .025 inch, i. e. roughly midway between 1/16th and 1/32nd of an inch. Satisfactory results can be attained with wall thicknesses up to 1/16th of an inch, and down to 1/32nd of an inch, although with a wall thinner than 1/32nd inch, the mandrels become fragile and subject to damage in handling the same in a factory.

V. *Stripping.*—As the mandrels C merge from the oven, the container bodies A are stripped from the mandrels. It is of course possible to employ a hand stripping method in which the operator grasps the container body in his hand and peels or slides it off the mandrel. To facilitate the release of the container bodies from the mandrels, the mandrels are constructed with a metal surface which has minimum adhesion to the cured plastic material. I prefer to employ a mandrel with a nickel coating (a smooth bright coating) thereon, and find that a preferable construction is a copper or brass mandrel body plated with a nickel surface. However, it is also possible to employ, with satisfactory results, a mandrel having a wall of solid aluminum, i. e. with an aluminum surface. In this case the surface will be buffed to a high polish so as to be quite smooth.

For most satisfactory stripping, I prefer to employ a blow-off operation such as that indicated at V. in Fig. 12, in which an air hose 30 is applied to the tubular fitting 28 of manifold 27, and air under pressure is then injected through the manifold 27 into the several mandrel stems 24. The air will escape through fluted channels 26 in the outer surface of stem members 25, and thence between the abutting ends of cap stem 18 and the mandrel, into the space between the mandrel and the surrounding container body. Thus the container body is inflated, loosening it from its adhering contact with the walls of the mandrel, and reducing to a minimum the frictional engagement between the container body and the mandrel. When such frictional engagement is reduced to a point where the force thereof is less than the force of the air pressure acting between the mandrel and the container body, the container body will be blown off the mandrel as indicated by the arrow at V. in Fig. 12.

MODIFIED FORMS

Figure 7:
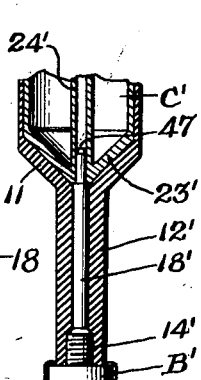
Fig. 7 is a fragmentary axial sectional view of a modified form of container made in accordance with the invention, together with its modified mandrel.

Fig. 7 illustrates how the invention may be utilized in the construction of a somewhat modified form of flexible tube container having an elongated neck portion 12'. Fig. 7 also illustrates how the invention may be utilized in fabricating a container in which the thread at the end of neck 12' is an internal thread instead of an external thread as disclosed in Fig. 1, and in which the cap B' has, instead of the internally threaded skirt portion of Fig. 1, an externally threaded plug 14', and has an elongated stem member 18' projecting from plug 14'.

The mandrel C' in this case may have a stem 24' which is terminated flush with the end of the nose portion 23' of the mandrel. Cap B' is initially attached to the mandrel by means of a teet 47 constituting a reduced diameter extension of stem 18'. Teet 47 is receivable in the end of stem 24' with a friction fit.

The internal threads in the end of neck 12' are formed against the external threads of plug member 14'. An extended throat is formed in neck 12' by the forming of the dipped plastic material against the cylindrical external surface of core 18'. Stem 18' may be of the same diameter as the tube 24', defining the end of nose 23', whereby there will be a smooth joinder between the throat and the inner wall of shoulder member 11 in the container.

In the stripping of this container air will be forced out of the end of stem 24' and around teet 47, inflating and forcing off the container, with cap B' and stem 18' remaining attached to neck 12'.

Figures 8, 10:
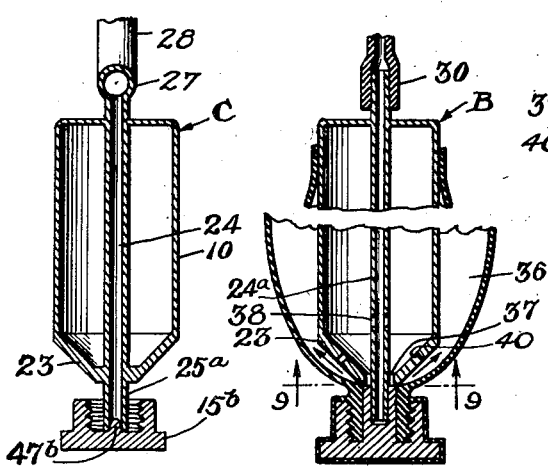
Fig. 8 is an axial sectional view of the container, mandrel and cap assembly in the removal step.
Fig. 10 shows another modified form of the mandrel and cap assembly.

Fig. 8 illustrates how the air pressure escaping from between the abutting ends of the mandrel and the cap stem 18, will inflate the space between the mandrel and the container body, releasing the contact between the container body and mandrel except at the open upper end thereof. Fig. 8 also illustrates a slight modification in the mandrel, in which, instead of the fluted passages 26, a series of apertures 37 and/or 40 are provided in the nose 23 of the mandrel and the stem 24a is provided with apertures 38 through which the air pressure may enter the mandrel for escape through the aperture 37. From this point the air escapes between the abutting ends of the mandrel and cap stem 18 in the same manner as above described.

Fig. 10 illustrates a further modification of the mandrel and cap assembly. In this arrangement, the cap 15b has a small central teet 47b adapted to be received with a frictional fit within the end of stem member 25a which may be a plain end portion of stem 24. Stem member 25a in this case functions to shape the throat passage in neck 12 of the container, and teet 47b has only the function of providing for attachment of the cap to the mandrel during the process of fabricating the container.

In the stripping step, air under pressure forced through stem 24 will force cap 15b slightly away from the end of stem member 25a, escaping past the end of stem member 25a into the annular space between the same and the throat passage of neck 12. Thence it will pass into the space between mandrel 10 and the body portion of the container, inflating the container and forcing it off the mandrel.

I claim:

1. Steps in the method of fabricating a flexible container having an internal body portion, a discharge neck and a cap having a thread attaching the cap to said neck, comprising: utilizing said cap, together with a mandrel having an axially projecting stem member, as a form for shaping the container; attaching the cap to said mandrel stem member with said thread coaxially surrounding said stem member and separated therefrom by an annular neck-forming space; suspending the mandrel and cap in an inverted position; dipping the mandrel and cap into a bath of liquid container material, thereby causing a coating of said material to adhere to the mandrel and to the remaining surface of the cap and to cause an annular body of said material to fill said annular space to become said neck, whereby to develop, in uncured form, said container having said neck threaded into said cap; removing the coated mandrel from the bath and subjecting it to heat to cure the coating and thereby set the container in its permanent form; and then stripping the container from the mandrel, with said cap remaining attached to said neck.

2. Steps in the method of fabricating a flexible tube container having a body portion and a reduced externally threaded neck, and a cap having an internally threaded skirt portion threaded onto said neck, comprising: utilizing said cap, together with a mandrel, as a form for shaping the container, with the cap and mandrel having releasably interengaging parts for fastening them together, at least one of said parts being in the form of a stem member extending between the end of the mandrel and the center of the cap and spaced from said skirt portion of the cap to define an annular space, with said stem member functioning to shape the throat passage of said neck; attaching the cap to the mandrel and suspending the mandrel and cap in an inverted position with said annular space opening upwardly; dipping the mandrel and cap, as thus suspended, into a bath of a container forming material in liquid form, thereby to apply a coating to the mandrel and to the cap and to fill the said annular space to form the container neck with external threads shaped by contact of the liquid material with said internal threads of the cap; withdrawing the mandrel and cap from the bath with said coating, adhering to the mandrel and cap; and then subjecting the coated mandrel and cap to heat to cure the adhering liquid into a hardened state to form said container with the cap threadedly attached thereto and encased in a thin film integral with the container body and hermetically sealing the cap and container together.

3. Steps in the method of fabricating a flexible container having a body portion, a reduced neck portion, a shoulder joining said neck portion to said shoulder portion, and a cap having an internal thread by which it is detachably attached to said neck portion, comprising: utilizing a mandrel as a form for shaping the container; preheating said mandrel; utilizing a stem member for attaching said cap, with said thread exposed, to the preheated mandrel with the stem extending between the free end of said mandrel and the center of said cap and separated from said thread by an annular space for shaping said container neck; suspending the mandrel and cap in an inverted position; dipping the mandrel and cap into a bath of liquid container material, thereby causing a coating of said material to adhere to the mandrel, and to the remaining surface of the cap, and to fill said annular space so as to form a neck threaded into said cap; removing the coated mandrel from the bath and subjecting it to heat to cure the coating while suspending it in said inverted position, and then stripping the container from the mandrel, with the cap remaining attached to said neck.

References Cited in the file of this patent

UNITED STATES PATENTS

| | | |
|---|---|---|
| 610,398 | Goodwin | Sept. 6, 1898 |
| 687,249 | Miller | Nov. 26, 1901 |
| 1,717,248 | Pestalozza | June 11, 1929 |
| 2,176,109 | Ratay | Oct. 17, 1939 |
| 2,230,151 | Winder | Jan. 28, 1941 |
| 2,320,583 | Forro | June 1, 1943 |
| 2,385,506 | Gurwick | Sept. 25, 1945 |
| 2,413,323 | Hills | Dec. 31, 1946 |
| 2,416,962 | Stather-Dunn et al. | Mar. 4, 1947 |
| 2,518,326 | Ingram | Aug. 8, 1950 |
| 2,588,571 | Porter | Mar. 11, 1952 |